(12) United States Patent  
Muftic

(10) Patent No.: US 10,284,379 B1  
(45) Date of Patent: May 7, 2019

(54) PUBLIC KEY INFRASTRUCTURE BASED ON THE PUBLIC CERTIFICATES LEDGER

(71) Applicant: Sead Muftic, Rockville, MD (US)

(72) Inventor: Sead Muftic, Rockville, MD (US)

(73) Assignee: Sead Muftic, Rockville, MD (US)

( * ) Notice: Subject to any disclaimer, the term of this patent is extended or adjusted under 35 U.S.C. 154(b) by 0 days.

(21) Appl. No.: 16/259,651

(22) Filed: Jan. 28, 2019

Related U.S. Application Data

(63) Continuation of application No. 15/163,403, filed on May 24, 2016, now abandoned.

(51) Int. Cl.
*H04L 29/06* (2006.01)
*H04L 9/32* (2006.01)

(52) U.S. Cl.
CPC .......... *H04L 9/3263* (2013.01); *H04L 9/3247* (2013.01); *H04L 9/3268* (2013.01); *H04L 2209/38* (2013.01); *H04L 2209/56* (2013.01)

(58) Field of Classification Search
CPC ... H04L 9/3263; H04L 9/3247; H04L 9/3268; H04L 2209/38; H04L 2209/56
USPC ....................................................... 713/156
See application file for complete search history.

(56) References Cited

U.S. PATENT DOCUMENTS

| 2005/0065799 A1* | 3/2005 | Dare .................. G06F 21/6245 705/50 |
| 2017/0012780 A1* | 1/2017 | Kaliski, Jr. ........... H04L 9/3247 |

OTHER PUBLICATIONS

Fromknecht, C., Velicanu, D., & Yakoubov, S. (2014). A Decentralized Public Key Infrastructure with Identity Retention. IACR Cryptology ePrint Archive, 2014, 803 (Year: 2014).*

* cited by examiner

*Primary Examiner* — Yogesh Paliwal
(74) *Attorney, Agent, or Firm* — Morris, Manning & Martin, LLP; Daniel E. Sineway, Esq.; Daniel Begasse

(57) ABSTRACT

Systems and methods for managing public key certificates and supporting the users thereof. The certificates are cryptographically encapsulated objects that bind the identities of their owners to public keys and provide digital signature mechanisms for other users to verify the binding and correctness of other attributes of the certificate. Certificates include double links that reflect their validation and position in a public certificates ledger, thereby preventing insertion or removal of certificates in the ledger. Certificate protocols of the system include requesting issuance of certificates, issuing and returning certificates to their requesting users, storing certificates in the certificates ledger, requesting and distributing certificates to transaction partners, verification of certificates by transaction partners, and revoking certificates by their owners. These protocols are performed as direct peer-to-peer transactions between the members of the system.

16 Claims, 3 Drawing Sheets

User Certificate after processing by the user

```
BIX Certificate ::= SEQUENCE {
    Header ::= SEQUENCE {                    ←——— 101
        sequenceNumber    INTEGER
        version           INTEGER
        issuingDateTime   CHOICE {
            UTCTime,
            generalizedTime
        }
    }
    Subject ::= SIGNED SEQUENCE {            ←——— 102
        subjectBIXID      INTEGER,
        subjectDateTime   CHOICE {
            UTCTime,
            GeneralizedTime
        }
        signatureAlg      AlgorithmIdentifier,
        subjectPublicKey  OCTET STRING
    }
    SubjectSignature ::=    BIT STRING       ←——— 103
    Issuer ::= SIGNED SEQUENCE {             ←——— 104
        issuerBIXID       INTEGER,
        issuerDateTime    CHOICE {
            UTCTime,
            GeneralizedTime
        }
        signatureAlg      AlgorithmIdentifier,
        issuerPublicKey   OCTET STRING
    }
    IssuerSignature ::= BIT STRING           ←——— 105
    BackwardCrossSignature::= BIT STRING     ←——— 106
    NextSubject ::= SIGNED SEQUENCE {        ←——— 107
        nextSubjectBIXID     INTEGER,
        nextSubjectDateTime  CHOICE {
            UTCTime,
            GeneralizedTime
        }
        signatureAlg         AlgorithmIdentifier,
        nextSubjectPublicKey OCTET STRING
    }
    NextSubjectSignature::=  BIT STRING      ←——— 108
    ForwardCrossSignature::= BIT STRING      ←——— 109
    Extensions ::= SEQUENCE {                ←——— 110
        extnID            objectIdentifier
        critical          BOOLEAN
        extnValue         OCTET STRING
    }
}
```

FIG 1: BIX Certificate

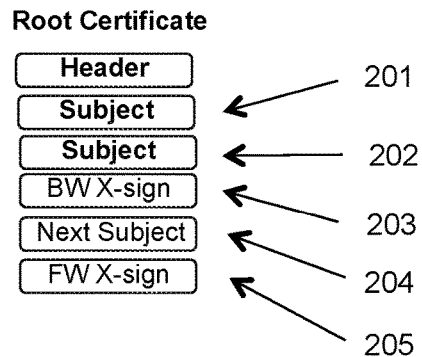
FIG 2: Root BIX Certificate
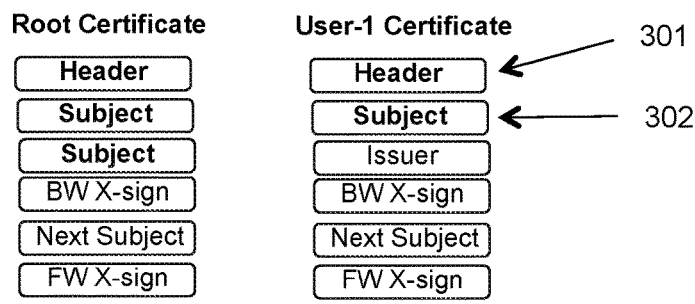
FIG 3: Initial Step of the Certification Request Protocol
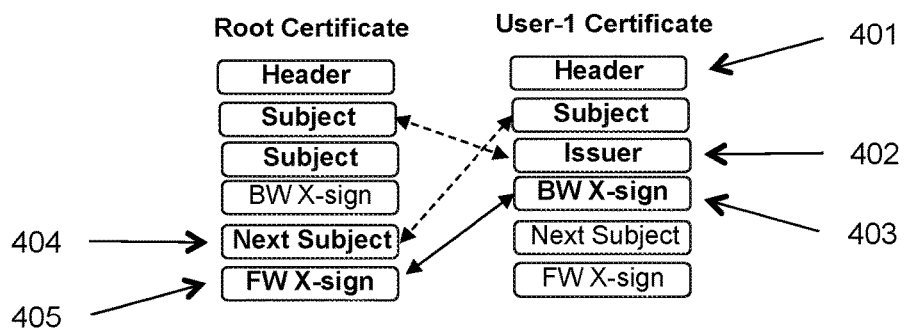
FIG 4: User Certification Request after processing by the Issuer

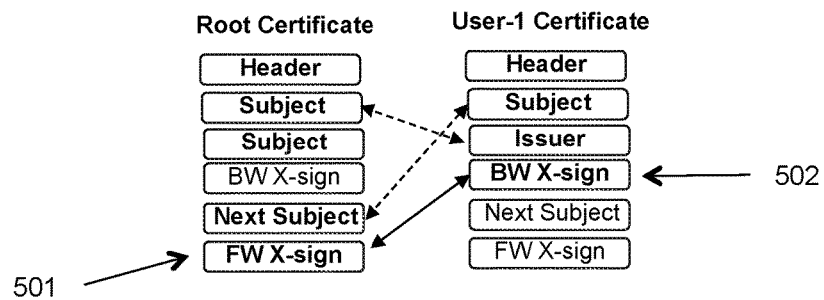
FIG 5: User Certificate after processing by the user
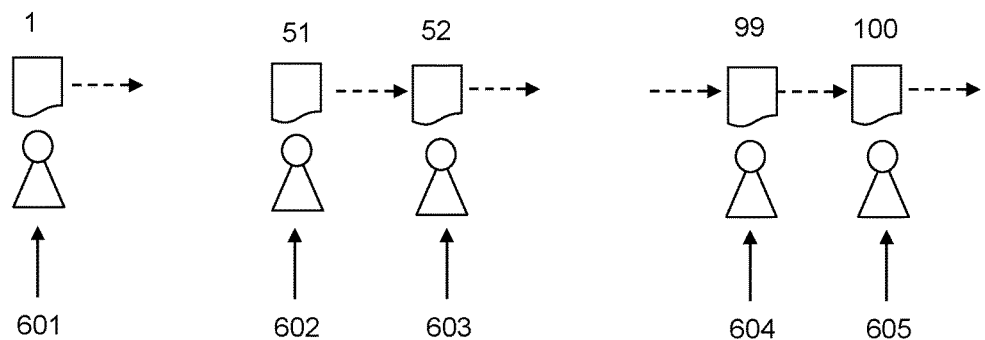
FIG 6: BIX Certificates Ledger as Chain of Certificates

PUBLIC KEY INFRASTRUCTURE BASED ON THE PUBLIC CERTIFICATES LEDGER

CROSS REFERENCE TO RELATED APPLICATIONS

This application is a continuation patent application, which claims the benefit of, and priority to, U.S. patent application Ser. No. 15/163,403, filed on May 24, 2016, and entitled "PUBLIC KEY INFRASTRUCTURE BASED ON THE PUBLIC CERTIFICATES LEDGER," the disclosure of which is incorporated by reference in its entirety as if the same were fully set forth herein.

REFERENCES CITED

| U.S. patents | |
|---|---|
| 9,344,832 | Shell, etal. |
| 9,344,282 | Yoo, et al. |
| 9,344,425 | Belton, etal. |
| US 20080244685 | Andersson, etal. |
| US 20150164192 A1 | Gross, A. |
| US 20150324787 A1 | Schaffner, D. |

OTHER PUBLICATIONS

Ali, M., et al., "*Blockstack: Design and Implementation of a Global Naming System with Blockchains*", 2016 USENIX Annual Technical Conference (USENIX ATC'16)
Bitcoin (web site) https://en.bitcoin.it/wiki, 2010
BitID (web site) "*BitID Open Protocol*", http://bitid.bitcoin.blue/, 2015
Brickell, E., et al., "*Direct Anonymous Attestation*", CCS '04, ACM 2004 pp. 132-145
Certificate Transparency (web site) https://www.certificate-transparency.org/
Chaum, D., "*Security without identification: transactions system to make big brother obsolete*", CACM, 1985
Dot-bit (web site) http://dot-bit.org/
Fromknecht, C., et al., "*CertCoin: A Namecoin based decentralized Authentication System*", MIT, Class 6,857 Project, May 14, 2014
Fromknecht, C., et al., "*A Decentralized Public Key Infrastructure with Identity Retention*", MIT, Class 6,857 Project, Nov. 11, 2014
Garman, Ch., et al., "*Decentralized Anonymous Credentials*", IACR Cryptology ePrint Archive, 2013:622, 2013
Maymonker, P., at al., "*Kademlia: A peer-to-peer information system based on the XOR metric*", http://kademlia.scs.cs.nyu.edu
Melara, M., et al., "CONIKS: Bringing Key Transparency to End Users", 247h USENIX Security Symposium Namecoin (web site) https://www.namecoin.org/
RFC 5280, Cooper, D. et al, "*Internet X.509 Public Key Infrastructure Certificate and Certificate Revocation List (CRL) Profile*", IETF RFC 5280
RFC 6962, Laurie, B., et al., "*Certificate Transparency*", RFC 6962, June 2013
Zyskind, G., "*Decentralizing Privacy: Using Blockchain to Protect Personal Data*", MIT Media Lab

TECHNICAL FIELD OF THE INVENTION

This invention is related to the security, privacy, and anonymity of peer-to-peer transactions, without the participation and/or assistance of third parties. More specifically, it is focused on certificates and certification protocols based on a globally available, distributed, append-only, public ledger containing certificates as its objects. The key contribution and the core innovation is the concept of a public key infrastructure in the form of a community-based public certificates ledger that manages certificates using direct, peer-to-peer protocols without participation or assistance of any third-party.

BACKGROUND OF THE INVENTION

Public key cryptography is one of the core cryptographic technologies for various aspects of computer security. It is well known that to use it effectively, two problems must be solved: the protection of private keys and the distribution/validation of public keys. It is also well known that the standard approach to the latter problem is to use digital (X.509) certificates that bind the identities of public key owners to their public keys. Being digitally signed, certificates enable verification of that binding, i.e., the ownership and correctness of the public keys. At the time of this invention, the standard solution for the distribution and validation of certificates and their public keys is the concept of public key infrastructure (PKI).

At the time of this invention, the security of users, their applications, data and transactions, especially when used over the open Internet, is a major concern. Many solutions exist, all providing standard security services: entity identification, entity authentication, data confidentiality, data integrity, access control, authorization, and non-repudiation. X.509 certificates and PKI is the core enabling technology and the supporting infrastructure for these security services.

But, at the time of this invention, two new categories of services are gaining importance and global attention: user privacy and anonymity. Privacy is defined as a property of an overall system in which identities, application data, and transactions are known only to authorized transaction partners and service providers and not to unauthorized and illegal users, such as hackers. Anonymity is defined as a property of the system where even authorized users and transaction partners cannot learn about the identities of their transaction partners.

Standard X.509 certificates cannot be used if privacy and anonymity services are required. The reasons are that, first, they contain full and explicit name and other identifying attributes of the certificate owner, the so-called Distinguished Name (DN) and second, they also contain the full identity of their issuer. Therefore, both identities are recognized by all transaction parties, what violates privacy and anonymity of users.

Another important trend at the time of this invention is the introduction of so-called peer-to-peer transactions. Those are transactions that are executed directly between two parties and without support or participation of any third party. These transactions are more efficient than transactions performed with third-party assistance. Not only that they are performed directly between transaction parties, but they also do not use complex and cumbersome protocols of third-party providers. In addition to efficiency, such transactions also provide user privacy, as there are no parties involved in a transaction other than participants themselves. With a suitable selection of identifying attributes for the parties involved, such transactions can also provide user anonymity.

Besides the inadequacy of X.509 certificates for applications and transactions where user privacy and anonymity is required, another problem is that when providing security services, most, if not all of those services, are provided by or require the assistance of (trusted) third parties. Such arrangement has no anonymity of users, as third parties learn everything about the users participating in the transactions, sometimes even their sensitive personal data, such as cryptographic keys, bankcard numbers, etc. It is clear that PKI cannot be used for peer-to-peer transactions, as it requires the use of Certification Authorities (CAs) as trusted third parties for validation of certificates.

Finally, another important concept related to X.509 certificates and PKI is trust. With PKI roles and protocols, trust must be placed in all CAs. Not only trust that they will perform their functions correctly and in a timely manner, but also that they will not malfunction or cheat, due to illegal modifications or destruction of their software and data. Trust in third parties is the requirement for all standard security services and goes directly against the concept of peer-to-peer applications and transactions. With such transactions, not only that there are no other parties participating in transactions, but there is no need to trust any component or function of the system. All aspects of each transaction—the identities of parties in the transaction, the correctness of transaction data, the validity of a transaction, the date/time of the transaction, and the authorization to participate in, and to perform, the transaction—must be verified only by the participating parties themselves. Obviously, this approach is not possible with PKI and X.509 certificates, as all aspects of transaction verification depend upon the verification of X.509 certificates, which is done using the assistance of trusted third parties.

In conclusion, for peer-to-peer transactions that require security, privacy, and anonymity, the standard components of X.509 certificates and PKI cannot be used. Because certificates are the backbone of all security services, it is obvious that management and use of certificates require new solutions and new infrastructure without assistance of third parties and their protocols. This invention describes such new type of certificates, new type of peer-to-peer certificate protocols, and new infrastructure for management and use of certificates based on globally available, distributed, append-only public ledger without assistance of any third party.

The certificates infrastructure described in this invention is a component of a larger and more general system that supports peer-to-peer exchange of secure, private, and anonymous data and transactions in an open Internet environment using a public ledger. In principle, a public ledger is a public archive of all transactions that have been performed in the system, and its main purpose is to provide data, mechanisms and protocols to verify these transactions without assistance of third parties. The transactions individually or sometimes grouped in blocks are cryptographically encapsulated and mutually linked in a functional, cryptographic or time sequence. This concept of the public ledger is known as a blockchain. Thus, conceptually broader system supports secure, private, and anonymous peer-to-peer transactions based on a concept of public ledger (blockchain) used to verify transactions. This system is called "Blockchain Information eXchange" (BIX) system.

OVERVIEW OF THE REFERENCES CITED

The ideas described in this invention are innovative. This means that at the time of this invention, searching publications for the keywords "certificate," "ledger," and "blockchain" did not produce any results, implying that equivalent ideas have not yet been published. For instance, there exist some ideas called "Bitcoin identities," but they are merely the use of user-friendly forms of Bitcoin addresses without any additional security services or features. Most current suggestions for the security of applications, users, and transactions are based on use of standard Bitcoin blockchain and they focus on protecting the local data used by Bitcoin wallets. Search queries do not retrieve any scheme or protocol for the secure, reliable, and verifiable distribution of public addresses, keys, and identities, even for the Bitcoin system. The search does not reveal any ideas or concepts of the blockchain as the public certificates ledger to support the security, privacy, and anonymity of applications or transactions, other than payments using cryptographic currencies and proof-of-existence for documents.

Therefore, certain concepts from the potential prior art reviewed in this section are used only as analogies to the solutions described in this invention and have only vague resemblance to the ideas and solutions presented in this invention.

An Analogy with X.509 Certificates and PKI

One of the purposes of the BIX certificates designed in this invention is to distribute users' anonymous identities and public keys in order to enable the verification of their correctness, binding, and ownership. This is also one of the purposes of X.509 certificates. Therefore, it may be assumed that BIX certificates are analogous to X.509 certificates. However, the core differences are that (a) user credentials contained in BIX certificates are anonymous, (b) BIX certificates are not issued by any trusted third party, (c) BIX certificates are linked in a public ledger, and (d) BIX certificates are validated directly by their users, not third parties on behalf of users.

The standard X.509 certificate profile includes the field version that is used to designate the version of the certificates. This invention also uses the field version in BIX certificates, but it is used to designate the type rather than the version of the certificate, as explained in the Detailed Description of the Invention section. This field is equivalent to the attribute keyUsage in X.509 certificates. The current value of the field version is one (1), denoting a certificate that can be used for security services, i.e., the anonymous identification, authentication, and exchange of secret session keys.

The serialNumber field in a standard X.509 certificate is used as the reference to the specific X.509 certificate itself, to identify it from others issued by the same CA. It is also used to locate the certificate in the Certificate Revocation Lists (CRLs). BIX certificates are issued by members of the BIX community and "chained" in the certificates ledger, so a serial number as a reference to a specific issuer is not needed. However, for easier referencing in the certificates ledger and for some other purposes, which are explained in the Detailed Description of the Invention section, BIX certificates contain the field sequenceNumber.

X.509 certificates have the component Subject. This is the segment with identifying attributes organized in the form of a Distinguished Name (DN). BIX certificates also have the component Subject, but instead of a DN for the explicit identification of a certificate's owner, this component contains a Personal Identification Number (called a BIX Identifier) as one of its attributes. This number is randomly assigned, so it represents a pseudonym, and, therefore, such identities of users provide their privacy.

X.509 certificates have a validity component comprised of date/time attributes; one is an issuing date/time and the other is an expiration date/time. BIX certificates do not expire, so they do not need expiration date/time.

X.509 certificates have an Issuer segment, which contains the DN of the CA that issued the certificate. In the BIX Certificates Infrastructure (BCI), the issuer is one of the other members of the BIX community. The structure of the segment Issuer in BIX certificates is equivalent to the structure of the segment Subject.

Finally, X.509 certificates have extensions. The purpose of these extensions is to enhance and, more precisely, to designate the types and purposes of certificates (i.e., authentication certificates, signature certificates, certificate signing certificates, and key exchange certificates), to identify the supporting components of the PKI (such as the repositories of revoked certificates and the directories where certificates are stored), and to indicate the policy under which certificates have been issued. BIX certificates also have extensions. However, specific extensions are not specified because they are used to designate different aspects of their management and use. So, in BCI, extensions represent "placeholders" for such extended and additional aspects, which will be more refined in subsequent versions of the system.

The main drawbacks of the current concept of the PKIs are that they represent very complex infrastructures, they critically depend upon trust in third parties, and they use complicated procedures to distribute and validate certificates. Another major inconvenience is their scaling and federation, which may be solved either by issuing all certificates under one Root Certification Authority or by establishing federated PKIs. Both approaches are complicated and neither has been broadly deployed in practice, which clearly indicates that these complexities are obstacles for the establishment and use of large-scale PKIs. A public certificates ledger has one general advantage over such large and complex infrastructures, built with use and dependent on third parties: it does not depend upon and does not use any third parties. This makes it very convenient for many purposes and applications, one of which is the BIX Certificates Infrastructure described in this invention.

An Analogy to the Bitcoin System and its Blockchain

Bitcoin is an anonymous payment system that uses the concept of a public ledger—called a blockchain—to perform and verify payment transactions. Its blockchain has a specific structure and protocols for its creation, distribution, and use and is primarily suitable for payment transactions. Some innovative ideas have been to use the same concept and the existing operational Bitcoin infrastructure to perform other types of community-based and anonymous transactions. Some examples are shared file storage, a secure file-sharing system, and a document management system with digital notary services or proof-of-existence for documents.

Although Bitcoin is appropriate for anonymous payments and is operational at the time of this invention, the system has many conceptual and operational problems. Some of them are small block size, slow throughput of transactions, vulnerabilities of private cryptographic keys, cheating by collaboration of miners, etc. In addition to all these problems and weaknesses, in order to provide the full scope of security and anonymity services for other types of applications, the system also needs certain conceptual extensions. Not all applications need packaging of transactions in blocks or chaining of transactions.

BIX certificates support both public key and secret key cryptographic protocols and services, which is an important distinction compared to Bitcoin addresses. Bitcoin transactions are based on addresses that, in essence, represent the recipient's public key; thus, they can be used only by a single recipient. BIX certificates, on the other hand, support transactions with multiple targets/recipients and also group transactions with multiple senders.

In the Bitcoin protocol, the address (or the Bitcoin account) of the user who will receive payment must be available to the partner who makes the payment. In addition, all of the partner's previous transactions must be available to the person receiving the payment to verify the correctness and validity of the payment transaction.

However, there is no formal protocol to distribute and verify Bitcoin accounts (addresses) by partners. At the time of this invention, they are mainly distributed out-of-band or in the graphics form, over-the-counter or over-the-Web. In other words, this approach is not satisfactory for business transactions that need verified, correct, and legitimate personal and corporate parameters. With the current concept, the distribution of Bitcoin addresses over the network is vulnerable to man-in-the-middle attacks.

Bitcoin payments are verified by checking that the sender (a) has a sufficient balance in his/her account to make the payment and (b) he/she does not make double payments. Both verifications are performed by tracing the sequence of all transactions in the blockchain starting from the trusted "coinbase" transaction up to the latest transaction received by the partner who is making payment. But, for many applications, using peer-to-peer transactions that require the verification of personal credentials and/or transactions, this concept is not appropriate. For instance, in an electronic voting application, there is no starting trusted "coinbase" transaction. Furthermore, "double spending" is possible, as voting may be simultaneous at the city, regional, and state levels and the identity of the voter, the correctness of the vote, and the controlled use of voting rights must all be verified and validated, but with full anonymity.

Peer-to-Peer Applications with Anonymity

After the introduction of the concept of the blockchain by the Bitcoin system, many ideas emerged for innovative applications of the blockchain. But, for most of them, the current Bitcoin blockchain is not appropriate at all. First, there are serious problems with the protection, integrity, and availability of Bitcoin credentials. The ownership and correctness of public addresses cannot be verified and the protection of private credentials is inadequate. Second, the current concept of the Bitcoin blockchain contains only financial and other similar transactions that require linear ordering and linear dependencies of transaction data. This structure and transaction relationships are inadequate for many applications that need blockchain, but for which transactions cannot be organized in a linear structure. Furthermore, while anonymity may be an advantage for certain types of transactions, it presents problems for others. The examples of such transactions are voting, digital notarization, trading of commodities, etc.

Conclusions

Based on the discussion in this section, it is obvious that the current concepts of X.509 certificates, PKI, and Bitcoin payment transactions and the Bitcoin blockchain for their verification are inadequate for a wide spectrum of new and innovative applications, transactions, and services that need the security, privacy, and anonymity of users, their transactions, and their data.

Current problems, trends, innovative applications, and disruptive ideas motivated the innovation described in this invention. Based on the two aforementioned examples, Bitcoin payments and electronic voting, the key conclusion is that personal credentials, such as identities and cryptographic credentials, must be managed separately from applications and transactions. Personal credentials are needed to verify participants' membership, authorization, and status in the BIX system. Once that is accomplished, valid and regular BIX members may use different applications and perform different types of transactions, each of which requires their own application-specific data and credentials.

SUMMARY OF THE INVENTION

The Background of the Invention section mentions several problems with current X.509 certificates and PKI for applications that support security, privacy, and anonymity and the transactions performed as direct peer-to-peer transactions without the participation and/or support of third parties. This invention solves these problems by introducing several new concepts and solutions.

First, a new type of cryptographically encapsulated object, called a BIX certificate, is created. Its purpose is equivalent to X.509 certificates, i.e., to support verification of binding between user identities and their public cryptographic keys and verification of that binding and in that way support security services for users and transactions, but enhanced with privacy and anonymity. BIX certificates enable applications and transactions whose main purpose is to exchange sensitive personal and business information and data to provide full security, privacy, and anonymity of their users and data.

Second, the concept of the new certificates infrastructure, called the BIX Certificates Ledger (BCL), is created. As the general concept, a ledger is a collection of public user attributes and transactions that are linked in a time, cryptographic, and/or functionality sequence. Certificates included in a public certificates ledger are available to all users who use some application that requires verification of user attributes and transactions data, but with user anonymity. Contrary to the concept of the Bitcoin, the BCL and all of its protocols are truly peer-to-peer, i.e., community-based, without requiring third-party assistance.

Third, the new concept of certificates protocols is created. The protocols are performed in the BIX Certificates Infrastructure and support the following functions for users and their certificates: requesting own certificates, issuing and returning certificates to their requesting users, storing certificates in the public certificates ledger, requesting and distributing certificates to the transaction partners of certificate owners, enabling verification of certificates by transaction partners, and revoking certificates by their owners.

The fourth innovative idea and solution to the three problems is the concept of community transactions. A community is a group of anonymous users who have agreed to participate in some application(s) or to support the security, privacy, and anonymity services provided by the BCL. An example is a community for sharing files or proving proof for the existence of documents. Users join the community only to participate in community-based transactions, such as, for example, for making a donation to charity. It is important to emphasize that users do not have to trust the members of the community, as verification of their identities and certificates is one of the main purposes of the BCI itself. Even if malicious users are members of a community, they cannot damage other members in the BCI, or the BCI's certificates and protocols.

It should be emphasized that the concept of the BCI specified in this invention is both unpermissioned and also permissioned infrastructure. If the infrastructure is unpermissioned this means that it does not have sponsoring entities that approve users who want to join the infrastructure. In other words, any user can join without being approved, sponsored, or supported by any other party, except users who are already the members of the BIX community. However, some applications, such as banking, trading stock, paying taxes, or voting, require entities that approve users to join the infrastructure and perform transactions with security, privacy, and anonymity. BCI with such type of entities is called permissioned. Participants, certificates, and protocols in that type of certificates infrastructure are the same as in the community-based, unpermissioned infrastructure described in this invention. The details of a permissioned infrastructure are different only with respect to registration of users in the BIX system, what is the protocol described in another invention.

The solutions described in this invention resolve the conflict between, on the one hand, the requirement for explicit sharing of identities and credentials for security services and, on the other hand, the prevention of that sharing to ensure privacy and anonymity. The cryptographic objects and protocols described in this invention can be used with all community-based applications that require privacy and anonymity of validated users. Therefore, based on the new concept of the public certificates ledger, BIX certificates, the protocols for their management and use, and the infrastructure for their distribution and verification represent technologies and infrastructure supporting a new category of applications that provide security, privacy, and anonymity. In that sense, the system described in this invention enables secure, private, and anonymous transactions equivalent to what X.509 certificates and PKI enable for users, applications, and transactions that require only security services.

In summary, the innovative ideas and solutions described in this invention solve three important problems for users, applications, and peer-to-peer transactions that require security, privacy, and anonymity: (a) the provision of peer-to-peer transactions that require identification, authentication, and authorization of users while also ensuring their privacy and anonymity, (b) the provision of security, privacy, and anonymity services by a community of users without third-party assistance, and (c) the provision of secure, private, and anonymous peer-to-peer applications and transactions without centralized application providers.

DESCRIPTION OF THE DRAWINGS

FIG. 1 shows the complete structure of the BIX certificate in the ASN.1 encoded form FIG. 2 shows the attributes of the BIX Root Certificate after its creation FIG. 3 shows Root Certificate and the certificate of the first BIX member before his/her certificate is issued by the BIX Certificate Policy Authority. The certificate is at the same time Certification Request message FIG. 4 shows Root Certificate and the certificate of the first BIX member after the Certificate Request by the BIX member has been processed.

FIG. 5 shows Root Certificate and the certificate of the first BIX member after validation by the BIX member being certified FIG. 6 shows an instance of the BIX Certificates Ledger

DETAILED DESCRIPTION OF THE INVENTION

The Structure and Attributes of BIX Certificates

BIX certificates are cryptographically encapsulated objects that provide binding between identities of their owners and their public keys, provide cryptographic mechanism (digital signature) to verify that binding and correctness of certificate attribute values and in that way enable distribution of identities and cryptographic keys to transaction partners and verification of the binding and correctness of attribute values by those partners. These features with BIX certificates are achieved with the full anonymity of all BIX system members.

The structure and attributes of BIX certificates and protocols for their creation, distribution, and verification support the three main purposes of these certificates: (1) reliably distributing and using the correct and legal identities and correct cryptographic keys of BIX system members, (2) verification of user identities and cryptographic keys, and (3) binding of identities to public cryptographic keys used for the security, privacy, and anonymity of various applications and transactions. These three purposes are met by BIX certificates having the following features and properties:

(1) They provide a method to verify that the attribute representing the public key contained in the certificate is correct, that is, the public key is created and owned by the designated certificate's owner,
(2) The recipient of the certificate is able to verify that there exists a private key that corresponds to the public key contained in the certificate, that is, the public key is not false and fabricated;
(3) They provide a method to verify that the anonymous identifier of the owner of the certificate is correct and globally unique, that is, the owner of the certificate has been registered in the BIX system;
(4) It is possible to verify that the binding of the public key to the anonymous identifier of the owner of the certificate is correct;
(5) There is a method to verify that the issuing date/time is correct;
(6) The BIX system member, when using the certificate of his/her transaction partner, can verify the validity of the certificate, i.e., that the values of all of its attributes are correct.

All of these requirements mean that public keys must be distributed without a threat of accidental or intentional modifications, that illegal insertions of fake certificates must be prevented and detected, that the unauthorized substitution of correct certificates must be detected, and that certificates' validity and correctness must be verifiable.

In addition to distributing anonymous identities and cryptographic keys, BIX certificates may also be extended with additional attributes in order to meet the functional requirements or other properties, suitable for or required by different types of applications beyond payments.

FIG. 1 shows the attributes and the structure of BIX certificates. Its attributes are as follows:

Header: The Header 101 is a segment with three fields.
  sequenceNumber: This field contains the sequence number of the certificate and reflects its relative position within the BIX Certificates Ledger with respect to the certificates of other BIX members.
  version: This field contains the value that designates the type of the BIX certificate.
  issuingDateTime: This field indicates the date and time of issuance of the certificate. It represents the start of the validity period for the current certificate.
Subject: 102 This is a segment with four attributes.
  subjectBIXID: This is the unique global identifier of the user who owns the certificate.
  subjectDateTime: This field indicates the date and time of creation of the public/private key pair.
  signatureAlg: This field designates the cryptographic algorithm with which the public key can be used.
  subjectPublicKey: This is the cryptographic public key that belongs to the owner of the certificate.
SubjectSignature: 103 This field contains the signature over the four Subject attributes created with the private key that corresponds to the public key contained in Subject segment. Therefore, the Subject segment is self-signed.
Issuer: 104 This is the same group of four attributes as in Subject, but they belong to the BIX member who issued this certificate.
Issuersignature: 105 This is a self-signed signature over the four Issuer attributes created by the issuer.
BackwardCrossSignature: 106 This field contains a double signature, one created by the issuer and the other created by the subject, over three Header fields concatenated with the hash of the Subject segment and the hash of the Issuer segment. This field guarantees the validity of Header and the binding between Subject and Issuer.
NextSubject: 107 This is the segment with four attributes equivalent to the Subject segment, but these attributes belong to the BIX member who was certified by this BIX member, i.e., it contains the Subject attributes of the next member in the BCL
NextSubjectSignature: 108 This is the field equivalent to the SubjectSignature, except it is created by the issuer over NextSubject attributes.
ForwardCrossSignature: 109 This field contains a double signature, one created by the issuer and the other created by the NextSubject BIX member over three Header fields concatenated with the hash of the Issuer segment and the hash of the NextSubject segment. This field guarantees binding between current BIX member, as the issuer of the next certificate, and the next BIX member to whom the certificate is issued
Extensions: 110 This field contains extnID and the value and criticality flags for the additional attributes that may be needed for specific purposes of the BIX certificate.

The field version in BIX certificates is used to designate the type of certificate. It is equivalent to the keyUsage attribute in X.509 certificates. If the value of the field version is one (1), it indicates a certificate that can be used for security services for anonymous identification, authentication, and exchange of secret session keys. Other values may be used in the future to denote other types of certificates, such as CRL-signing certificates and/or attribute certificates.

The field CertificateSerialNumber in the standard X.509 certificate refers to the specific X.509 certificate among those issued by a specific CA. It is also used to locate the certificate in CRLs. BIX certificates are issued by members of the BIX community and chained in the BCL, so serial numbers are not needed as a reference to the specific issuer. However, for easier referencing and for locating the certificate within the BCL, BIX certificates contain the field sequenceNumber. This field's content and its use are explained the section BCI Certificate Protocols, A.

BIX certificates have a Subject segment, as do X.509 certificates. But instead of a DN for explicit identification of the certificate's owner, this component contains as one of its attributes a personal identification number (called a BIX Identifier). Personal IDs are random numbers that are publicly available, globally unique, and anonymous in the BIX system. They are used as convenient references to individuals, equivalent to mobile numbers. They are unique and permanently assigned to BIX members. BIX certificates may be renewed and several of them may belong to the same member at the same time. Personal ID in the BIX system is unique, equivalent to a social security number issued in the United States, which is issued to a person once in his/her lifetime and is permanent and unique. BIX certificates in the Subject segment contain a public key and the associated algorithm identifier in the fields subjectPublicKey and signatureAlg. Four fields comprising the Subject segment: subjectBIXID, issuingDateTime, signaureAlg, and subjectPublicKey are signed. Because BIX certificates are created by their owners, the SubjectSignature field is created using a private key that corresponds to the public key in the Subject segment. This means that the Subject segment is self-signed.

BIX certificates do not expire, so they do not need an expiration date/time. The Subject segment of the BIX certificate contains a subjectDateTime field designating the time of its creation, i.e., the generation of the cryptographic keys pair. Locating certificates in the BCL and verifying their time validity is based on the special certification protocols. BIX certificates are chained in the BCL using personal BIX Identifiers and cross-signatures and organized in a time sequence using the field issuerDateTime from the Issuer segment.

In the BCI, the issuer of each certificate is one of the other members of the BIX community. The structure of the Issuer segment in BIX certificates is equivalent to the structure of the segment SUBJECT. The Issuersignature field is equivalent to the SubjectSignature field in that it contains signature over the Issuer segment, created by the certificate's issuer.

Other fields and segments of the BIX certificate, shown in FIG. 1, will be explained in subsequent sections.

The BIX Certificates Infrastructure (BCI) and Protocols

The BCI is (a) the collection of all BIX certificates issued to BIX members (users and applications) organized in the form of a double-linked list called certificates ledger, (b) components that manage these certificates, and (c) the corresponding protocols for their creation, distribution, and verification. Because no third parties are involved, the entities managing certificates are the BIX members themselves. This means that members have two roles: as users of the infrastructure and also as certification and validation authorities. If the infrastructure is unpermissioned, any person may join the community, obtain, and then use certificates for secure, private and anonymous transactions. If the infrastructure is permissioned, then there are the members of the community with the special role to validate and approve registration of new users in the infrastructure. So, the differences between permissioned and unpermissioned certificate infrastructures are not reflected through certification protocols, but through registration procedures, that are specified in another invention.

The main component of the BCI is the BCL, which is a linear, double-linked list of certificates without branches. This means that certificates are linked to one another in a linear sequence. In fact, BCL represents a certificates chain containing certificates of all members that are registered in the system. Each certificate points to the previous certificate (a "backward" link), that belongs to the BIX member who issued the certificate, and also points to the next certificate ("forward" link) that was issued by this BIX member. The backward link is represented by the Issuer segment of the certificate and the forward link is represented by the NextSubject segment.

BCI certificate protocols are performed as direct peer-to-peer transactions between members of the BIX system. The purpose of these protocols is to manage BIX certificates. Individual protocols are peer-to-peer transactions, which include requesting, issuing, distributing, verifying, and renewing BIX certificates. Each user executes these protocols using the BCI Agent—which is a PC, server, smart card, smart chip or smart phone application. The application must be preconfigured only with the URLs of several of the broadcast distribution system servers, so it can communicate with the components of the BCI to send and receive certificate protocol messages.

The subsystem of the BIX system called BIX Identities System supports registration of new users and the distribution of Coordinated Universal Time (UTC). Before executing the BCI certification protocol, each person must first register himself/herself in the BIX system. This is performed by registering in the BIX Identities System. Data provided by the user in this step are dependent on the type of the BIX Identities System (permissioned or unpermissioned) and the BIX Synchronization System used in the particular instance of that system. The most important in this step is that the BIX Identities System issues a unique identification number used as a BIX Identifier for the new BIX member.

It must be emphasized that one of the distinguishing features of the BCI, and advantages when compared with the standard X.509 PKIs, is that all protocol messages have only one object—the BIX certificate itself. Different messages are distinguished by the different content of the certificate. This simplifies the parsing and processing of protocol messages, as each step only handles the values of BIX certificate attributes.

Initiation of the BCI—Root Certificate

An instance of the BCI is established by creating its Root Certificate. The BCL starts with the Root Certificate, which is shown in FIG. 2. (Note: The convention for showing certificates in the drawings is that if a field is populated, it is shown in bold text; otherwise, it is shown in normal text). The Root Certificate is self-signed, i.e., the Subject segment 201 and the Issuer segment 202 are the same. This means that the BCI-initiating entity is the owner and also the issuer of the Root Certificate. This entity is called BIX Certificate Policy Authority. To initiate one specific instance of the BCL, the Root Certificate must be issued by an entity that will initiate the specific BCL (equivalent to the genesis transaction in the Bitcoin system). Because when a Root Certificate is initially created, that entity has still not issued certificates to any other member in the BIX system, so its fields BackwardCrossSignature 203, NextSubject 204, and ForwardCrossSignature 205 are not populated.

After the Root Certificate is generated and inserted into the BCL, the first BIX member may be registered and his/her certificate is issued by the BCI's initiating entity. The details of all BCI certification protocols are described in the next section, so at this point it is sufficient to mention that when the new certificate is issued by one BIX member to another:
  the NextSubject segment of the new certificate is left unpopulated, and
  the NextSubject segment of the issuing BIX member's certificate is populated with the Subject segment of the new certificate (the forward link).

This means that the last BIX member who joined the system is added to the "tail" of the BCL and he/she will be the issuer of the next certificate.

The BCL can be traversed both backwards (to reach the Root Certificate) and also forwards to find the tail/the end of the BCL, i.e., to find the user who is the issuer for the next certificate.

The BCI requires as its operational prerequisite a broadcast messaging system with instantaneous delivery of messages. This system, which we refer to as the BIX Synchronization System in this invention, performs three synchronization functions: (a) global synchronization of random numbers used as personal identification numbers for their global uniqueness within the entire BCI, (b) synchronization of the global Coordinated Universal Time (UTC), and (c) synchronization of newly issued certificates providing globally synchronized unique state of the entire BCI. This component of the BIX system is not a third party, as it only passively distributes BIX certificates and (for address purposes) verifies that the BIX identifier of the new BIX member is unique. An alternative, peer-to-peer message distribution system may also be used.

BCI Certificates Protocols

A. The Certification Request/Response Protocol

The Certification Request/Response protocol is executed by a person who wants to join the BIX system. The purpose of this protocol is to issue a BIX certificate to the new BIX member. This certificate must be issued by the BIX member who joined the BIX system last, because his/her certificate is at the tail of the BCL. Before initiating the Certification Request protocol, the new user should have been registered in the BIX Identity System and in that process should have obtained his/her BIX Identifier and an accurate Coordinated Universal Time (UTC). For this purpose, the components of the BIX Identity System have the functionality to maintain the Register of issued identifiers, so that duplicate identifiers are not issued. The BIX Identity System is also based on the use of the public ledger, and it is the subject of another invention.

As mentioned in the previous section, the BCL is initiated by the BCI Certificate Policy Authority by an action of generating the Root Certificate and publishing in the BCL. As already described, its Issuer segment is the same as its Subject segment, i.e., the certificate is self-issued. When the Root Certificate is generated, the BCI is ready to issue the certificate to the next BIX member.

FIG. 3 shows the initial step of the Certification Request/Response protocol, performed by the person who wants to join the BIX system. The protocol is initiated by the new BIX member who creates a certification request message and sends it to the BIX system. The message is an instance of the BIX certificate with the Header field 301 partially populated, the Subject segment 302 completely populated, and the attribute SubjectSignature 103 created as follows:

version is set to one (1)—this denotes the Security Services Certificate in the BIX Certificates Infrastructure;

subjectBIXID is set to the value of the BIX Identifier returned by the BIX Identity System;

subjectDateTime is set to the date/time returned by the BIX Identity system;

signatureAlg is set to the objectID of the cryptographic algorithm used with asymmetric keys;

subjectPublicKey is the public key generated by the user using local BCI Agent;

SubjectSignature is the signature over the complete Subject segment using the private key that corresponds to the subjectPublicKey.

Because the new person is completely detached from the BIX system, he/she does not know which BIX member has joined last the BIX system, i.e., who should be the issuer of the new certificate. Therefore, the new user broadcasts the certificate as a certificate request message to all current members in the BIX system. All members whose certificates have the NextSubject 107 segment populated will disregard the request. Only one member will accept and process the request, the member whose certificate does not have the segment NextSubject populated. In FIG. 3., user 1 is the new user and BIX Security Policy Authority is the issuer of the certificate. In all other cases two users are involved in this process, one of them is the issuer of the new certificate having his/her certificate with both Subject and Issuer segments populated.

That BIX member will be the issuer of the new certificate, which is issued by the following procedure:

sequenceNumber is populated with the value one higher than the value of the sequence number in the issuer's certificate;

issuingDateTime is set by the issuer to the current accurate date and time—Coordinated Universal Time (UTC). The Issuer segment and IssuerSignature are the Subject segment and SubjectSignature from the issuer's certificate; therefore, they are copied into the new certificate.

After populating the Header 401 and Issuer 402 segments, the issuer recovers the hashes from the SubjectSignature and Issuersignature fields, concatenates them with the hash of attributes from the now completed Header segment and signs that combination of hashes using the issuer's private key, creating an intermediate (single-signed) version of the field BackwardCrossSignature 403. In that way, the issuer binds the Subject segment from his/her own certificate with the Subject segment from the certificate of the new BIX member and creates a sequential relationship between the issuing BIX member and the new BIX member. This relationship is also enforced by the values of the field sequenceNumber of the two certificates, as the new certificate is created with the value of the sequenceNumber that is one larger than the value of the sequenceNumber of the issuer's certificate.

At the same time, the issuer updates the NextSubject 404 segment of his/her own certificate with the Subject segment of the new certificate. Then, he/she creates an intermediate (single-signed) version of the field ForwardCrossSignature 405 over the concatenated hash of the Header with the two hashes that were extracted from the SubjectSignature field and the NextSubjectSignature field of his/her certificate. This is shown in FIG. 4 as the relationships between certificates of the BCI Root Authority and User 1.

After completing the certificate of the new BIX member and extending his/her own certificate, as described, the issuer returns three certificates to the new user by submitting them to the BIX Synchronization System as a Certification Response message that includes the Root Certificate, its own certificate, and the certificate of the new BIX member. In the case of the very first user, only two certificates are returned: the Root Certificate and new BIX member's certificate. The two cross-linked certificates are shown in FIG. 5. The attribute ForwardCrossSignature 109 of the issuer's certificate and the attribute BackwardCrossSignature 106 of the new member's certificate have the same values that are signed. The value of the ForwardCrossSignature 501 attribute of the issuer's certificate is created using private key of the issuer, while the value of the BackwardCrossSignature 502 attribute of the new member's certificate is created using private key of the new member.

B. The Certificate Verification Protocol

After receiving three certificates, the new BIX member performs verification of the new certificate using two procedures:

(1) Completion of the issuer's certificate: He/she countersigns the ForwardCrossSignature 501 attribute of the issuer's certificate and returns that certificate to the issuer. In that way, the relationship between the issuer and the new member as his/her successor in the BCL is established. The purpose of this is to prevent the issuer from eventually being able to cheat by removing the NextSubject segment from his/her certificates and issuing the certificate to another user. That would "detach" the complete section of the BCL located beyond the cheating member. With the cross-signed field ForwardCrossSignature in the issuer's certificate, the new BIX member is tightly linked into the BCL, as he/she has the proof of who is the issuer of his/her new certificate.

(2) Verification of the new certificate: The new BIX member counter-signs the field BackwardCrossSignature 502 in his/her own certificate and, in that way, links it to the certificate of the issuer. After that, the member verifies the issuer's certificate by traversing the complete BCL either forward, starting with the Root Certificate and following the NextSubject references, or backward, starting from his/her certificate and following the Issuer references.

During the verification process, the new BIX member accumulates all certificates from the BCL, which is equivalent to downloading the blockchain in the Bitcoin payment system. Each certificate is verified and stored in the local storage of the BCI Agent containing verified, and therefore trusted, certificates of other BIX members for future use. It may be emphasized that this certificate verification procedure does not use and does not depend upon any third party. The user does not need to trust any other component in the system and the main purpose of the BCL is utilized by a pure peer-to-peer protocol.

C. The Certificate Request/Response Protocol

When a BIX member wants to establish a secure session or to perform some secure transaction with another BIX member, the two members must first exchange their BIX certificates. To do so, after establishing a communication connection and, eventually, an application context, each user sends his/her own BIX certificate to the other user. Because one user usually initiates the transaction, these two messages may be considered the Certificate Request and the Certificate Reply, respectively.

Alternatively, two users may also request and fetch certificates from the BCL. Since each certificate has its unique identification (sequenceNumber), BCL is organized as index-sequential database. Therefore, BCI Agent can retrieve the requested certificate by direct read.

After receiving the partner's BIX certificate, the receiver must first verify the certificate before using its attributes. Verification comprises two steps: verification of the fields included in the partner's certificate and verification of the membership of the partner in the BIX system. The first verification is performed by verifying the SubjectSignature 103, IssuerSignature 105, and BackwardCrossSignature 106. Both public keys for this verification are already available in the received partner's certificate. The membership of the partner in the BIX system is checked by verifying that the partner's certificate is included in the BCL. This procedure is equivalent to the verification of the user's own certificate after its issuance, i.e., by traversing the BCL from the partner's certificate backward to the already verified certificate. For that, the Issuer segment of each certificate being verified is used as the reference.

Referring to FIG. 6, assume that BIX members with certificate numbers 51 602 and 99 604 have just exchanged certificates and they want to verify each other's certificates. This procedure starts with the partner's certificate and may fall under one of three scenarios:

(1) If the partner's certificate is located backward in the BCL from the member's own certificate (the partner was registered before the current member), then the partner's certificate is already in the local BIX member's database of verified certificates. This is the case when BIX member 99 604 validates the certificate of BIX member 51 602;

(2) If the partner's certificate is located forward in the BCL from the BIX member's own certificate (the partner was registered after the current member) and no other forward partners have been previously validated, then the procedure will terminate when reaching its own certificate. This is the case when user 51 602 validates the certificate of user 99 604;

(3) If the partner's certificate is located forward in the BCL and some other forward partners have already been validated, then the procedure will terminate (a) immediately, if the partner's certificate is before some already validated certificate, which is the case when BIX member 51 602 validates the certificate of BIX member 99 604, but he/she has already validated the certificate of BIX member 100 605, or (b) when reaching the first already validated certificate of some other partner. This is the case when BIX member 51 602 validates the certificate of BIX member 99 604, but he/she has already validated the certificate of BIX member 52 603.

During the validation procedure, if the partner's certificate is located forward and beyond all currently validated certificates, the current member adds some additional certificates to his/her local certificates chain, all of those certificates located between the last validated certificate and the new partner's certificate. This is the case in (3b) above, when BIX member 51 602, during validation of the certificate of BIX member 99 604 adds to his/her certificate chain the certificates of all members 53 through 99 604. This means that, by establishing secure connections with new partners, BIX members extend their local chain of verified certificates. In other words, the longer the local BCL, the more efficient the verification procedure for new certificates.

D. The BIX Certificates Ledger (BCL) Request/Response

During the procedure of verification of partners' certificates, BIX members extend their local database of verified certificates. A longer BCL makes the verification procedure for certificates of new partners more efficient, as their certificates may be located between the current member's certificate and the last verified certificate in the user's local chain. In that case, verification is simple, as the target certificate has already been verified, even though the BIX member never had a direct relationship with that particular partner.

This leads to the obvious conclusion that it is beneficial for a BIX member to have all certificates currently in the BCL in his/her trusted (verified) local certificates chain, particularly all certificates between the last verified certificate in the member's local chain and the current tail of the BCL. But, as previously described, the BIX member who is at the tail of the BCL is the current issuer of the next certificate. It is clear from the description of the verification procedure of the new certificate that the issuer is certainly the member of the BIX system who is in possession of all certificates currently in the BCL. Therefore, that BIX member is in the position to distribute the full BCL to other members. This step may be performed automatically after completion of the registration procedure for new BIX members. But, to not overload the system, this distribution is performed upon requests by other BIX members.

When a BIX member wants to receive all certificates currently in the BCL, that member will send his/her own certificate to the BIX Synchronization System. This message is a Certificate Ledger Request and will be distributed to all current BIX members, just as the Certificate Request message. Similarly, this request is received out of the communications and applications context, so it will be disregarded by all users except the current issuer.

The issuer will collect all verified certificates from his/her local chain, starting with the certificate in the request message and up to his/her own certificate, he/she will build a Certificate Ledger Response message, and return it to the requesting BIX member. The requesting member will perform verification of each new certificate, starting with his/her own and moving forward to the tail of the BCL and will store all new certificates in the local database of verified certificates.

This procedure overloads the issuer, at least for a period of time, but it makes validation of partners' certificates for all other BIX members in the system much more efficient. This is an example of the community-based procedure, where one protocol is not optimal for one member in the system, but is optimal for the overall community.

Protection of Private Cryptographic Keys

BIX System is completely resistant to all attempts of penetrations and illegal use of the system by unauthorized users by stealing secret or sensitive parameters that belong to regular BIX users. The core cryptographic mechanism of the BIX system is public key cryptography. In all algorithms of that type, the sensitive and therefore secret element is private key. If the private key is stolen, the intruder can impersonate the victim. Such illegal action would enable the intruder to perform various transactions that require personal authentication.

Many different suggestions and solutions for this problem exist in the prior art literature, but they all have the same approach: protection of the private key by different security mechanisms. The practice has shown that all such mechanisms, even if based on use of smart cards, are not perfect and can be either bypassed or broken.

So, the obvious conclusion, in order to effectively eliminate this threat, is the solution where private key does not even exist in the system. The logic of this approach is simple: if a private key does not exist, it cannot be stolen. Following this conclusion, it is further obvious that, since private key does not exist in the system, it must be generated when needed to create signatures or open digital envelops. However, the approach cannot be generation of new private key whenever needed, since the corresponding public key and its certificate have already been distributed and in possession of many members of the BIX system. Therefore, the final conclusion about the approach used in the BIX system is that private key is generated when needed, but in such a way that it cryptographically corresponds to the public key/certificate already in the system. This can be accomplished by using deterministic procedure for generation of a key pair, with the seed represented by the secret parameter memorized by the user and not stored in the system.

For two the most popular asymmetric cryptographic algorithms, generation of a key pair is deterministic procedure. For the RSA cryptographic algorithm, two prime numbers are generated first, then the modulus, then private key (based on the convention that the value of the public key exponent is fixed, equal to 3 or 17). The procedure for generating two prime numbers is deterministic if it uses the seed. Using for that seed user's login parameter (which has fixed value) will always generate the same key pair. For the ECDSA the procedure is even simpler, as the private key is any random value selected in the specified interval. That random value can be easily generated deterministically, by using the fixed seed.

The conclusion about this innovative idea for protecting private cryptographic keys is that when a user logs into the BCI Agent, he/she gives his/her login parameter. This parameter is used as the seed to generate private key and that key is then used in a challenge/response authentication protocol and all other cryptographic operations.

If a user decides to change login PIN/password, new key pair must be generated and new certificate will be issued. Since BCL is append-only ledger, current user's certificate cannot be modified to indicate that it is revoked. This means that, after getting new certificate, the user will have multiple certificates in the BCL. This implies that the BIX Certificates Ledger (BCL) Request protocol must always return the last of all user's certificates stored in the ledger.

I claim:

1. A system for secure and anonymous transactions between one or more entities in a computer network, comprising:
    a plurality of computing devices in the computing network, each of the plurality of computing devices being associated with at least one of the one or more entities;
    at least one public ledger certificates server operatively connected to the plurality of computing devices, wherein the at least one public ledger certificates server is operable to maintain a Blockchain Information eXchange (BIX) Certificates Ledger comprising a plurality of cryptographically encapsulated certificate objects representative of verified identities corresponding to the one or more entities, wherein privacy and anonymity of the one or more entities is protected by implementation of the cryptographically encapsulated certificate objects, and wherein each cryptographically encapsulated certificate object in the plurality of cryptographically encapsulated certificate objects comprises:
        a Header set of attributes for identifying the cryptographically encapsulated certificate object in the at least one public ledger certificates server;
        a Subject set of attributes for identifying an owner entity of the cryptographically encapsulated certificate object, wherein the Subject set of attributes comprises a Subject time and date representative of a time and date corresponding to creation of a public key and a private key of the cryptographically encapsulated certificate object owner;
        a Subject digital signature comprising a digital signature over the Subject set of attributes via the private key of the cryptographically encapsulated certificate object owner;
        an Issuer set of attributes for indicating a particular issuing entity from the one or more entities;
        an Issuer digital signature comprising a digital signature over the Issuer set of attributes via a private key associated with the particular issuing system entity;
        a Backward Cross Signature attribute for cryptographically indicating a previously cryptographically encapsulated certificate object in the BIX Certificates Ledger;
        a Next Subject set of attributes for indicating a particular cryptographically digitally signed certificate object of a Next Subject entity in the BIX Certificates Ledger, the Next Subject entity included in the group of the one or more system entities;
        a Next Subject digital signature comprising a digital signature over the Next Subject set of attributes via a private key associated with a subsequent cryptographically encapsulated certificate object in the BIX Certificates Ledger; and a Forward Cross Signature attribute indicating the subsequent cryptographically encapsulated certificate object.

2. The system of claim 1, wherein the plurality of computing devices and the at least one public ledger certificates server are independent of third-party authorization entities.

3. The system of claim 1, wherein the private key of the cryptographically encapsulated certificate object owner is generated based on a deterministic algorithm.

4. The system of claim 3, wherein the private key is generated on-demand via a fixed seed value for cryptographically signing the cryptographically signed certificate objects and/or decrypting cryptographically signed certificate objects.

5. The system of claim 1, wherein the plurality of cryptographically signed certificate objects maintained within the BIX Certificates Ledger are linked in a linear sequence certificates chain.

6. The system of claim 1, wherein the BIX Certificates Ledger comprising the plurality of cryptographically signed certificate objects further comprises a root certificate, wherein the root certificate is a first cryptographically encapsulated certificate in the BIX Certificates ledger.

7. The system of claim 6, wherein the root certificate is self-signed and a Subject set of attributes and an Issuer set of attributes corresponding to the root certificate comprise the same identifying information.

8. The system of claim 1, wherein each cryptographically encapsulated certificate object in the plurality of cryptographically encapsulated certificate objects comprises an Extensions set of attributes for additional verification.

9. The system of claim 1, wherein the Header set of attributes comprises at least:
a sequence number representative of a relative position of the cryptographically encapsulated certificate object in the BIX Certificates Ledger,
a version number representative of a particular certificate type corresponding to the cryptographically encapsulated certificate object; and
an issuing date representative of a time and date of issuance of the cryptographically encapsulated certificate object.

10. The system of claim 9, wherein a version number of one (1) is representative of an initial certificate type for anonymous identification, authentication, and/or exchange of secret session keys.

11. The system of claim 1, wherein the Subject set of attributes further comprises:
a Subject identification number representative of a global identifier corresponding to the cryptographically encapsulated certificate object owner,
a signature algorithm representative of a cryptographic algorithm with which the public key can be used; and
a Subject public key representative of the public key associated with the cryptographically encapsulated certificate object owner.

12. The system of claim 1, wherein the Issuer set of attributes is substantially similar to the Subject set of attributes.

13. The system of claim 1, wherein the Next Subject set of attributes is substantially similar to the Subject set of attributes.

14. The system of claim 1, wherein the plurality of cryptographically encapsulated certificate objects are structured as a linear sequence certificates chain and are managed via a BIX Certificates protocol, the BIX Certificates Protocol allowing the one or more entities to join the BIX Certificates Ledger, verify the correctness of cryptographically encapsulated certificate objects, and request and/or receive cryptographically encapsulated certificate objects.

15. The system of claim 14, wherein the plurality of computing devices, the at least one public ledger server, and the BIX Certificates protocol comprise a BIX Certificates Infrastructure.

16. The system of claim 1, wherein each cryptographically encapsulated certificate object in the plurality of cryptographically encapsulated certificate objects is a BIX Certificate.

* * * * *